United States Patent [19]

Lipanski

[11] Patent Number: 4,619,081
[45] Date of Patent: Oct. 28, 1986

[54] COMBINED NOZZLE WITH AIR FOIL
[75] Inventor: Scott J. Lipanski, Fremont, Calif.
[73] Assignee: General Signal Corporation, Stamford, Conn.
[21] Appl. No.: 706,620
[22] Filed: Feb. 28, 1985
[51] Int. Cl.$^4$ .............................................. B24B 55/02
[52] U.S. Cl. .................................. 51/267; 125/13 R; 125/11 R
[58] Field of Search ...................... 125/13 R, 15, 11 R; 51/267

[56] References Cited

U.S. PATENT DOCUMENTS

| 2,899,781 | 8/1959 | Williams | 51/267 |
| 3,127,886 | 4/1964 | Miller | 51/267 |
| 3,628,293 | 12/1976 | Kobayashi | 51/267 |
| 3,744,189 | 7/1973 | Kakumu | 51/267 |
| 3,978,625 | 9/1976 | Klaassen | 51/267 |
| 4,024,674 | 5/1977 | Suzuki | 51/267 |

FOREIGN PATENT DOCUMENTS 593566  5/1959  Italy .................................... 51/267

Primary Examiner—Harold D. Whitehead
Attorney, Agent, or Firm—Charles H. Schwartz; Ellsworth R. Roston; Thomas R. Fitzgerald

[57] ABSTRACT

A combined nozzle and air foil for providing a flow of cooling and cleaning fluid to a rotating cutting blade providing cutting of a substrate. A nozzle portion for location intermediate the cutting blade and the substrate. The nozzle portion including at least one opening for directing a flow of cooling and cleaning fluid to the blade and to the cut area of the substrate. An elongated air foil portion mounted above and extending from the nozzle portion to be cut by the cutting blade to form an air foil on both sides of the cutting blade. The air foil producing a partial vacuum below the air foil and adjacent the opening in the nozzle to provide an efficient flow of the fluid to the blade and the cut area of the substrate. The combined nozzle and air foil portions are movably mounted to have the air foil engage the cutting blade to custom cut the air foil to match the dimensions of the cutting blade and to provide the proper location of the nozzle to direct the flow of the fluid.

16 Claims, 8 Drawing Figures

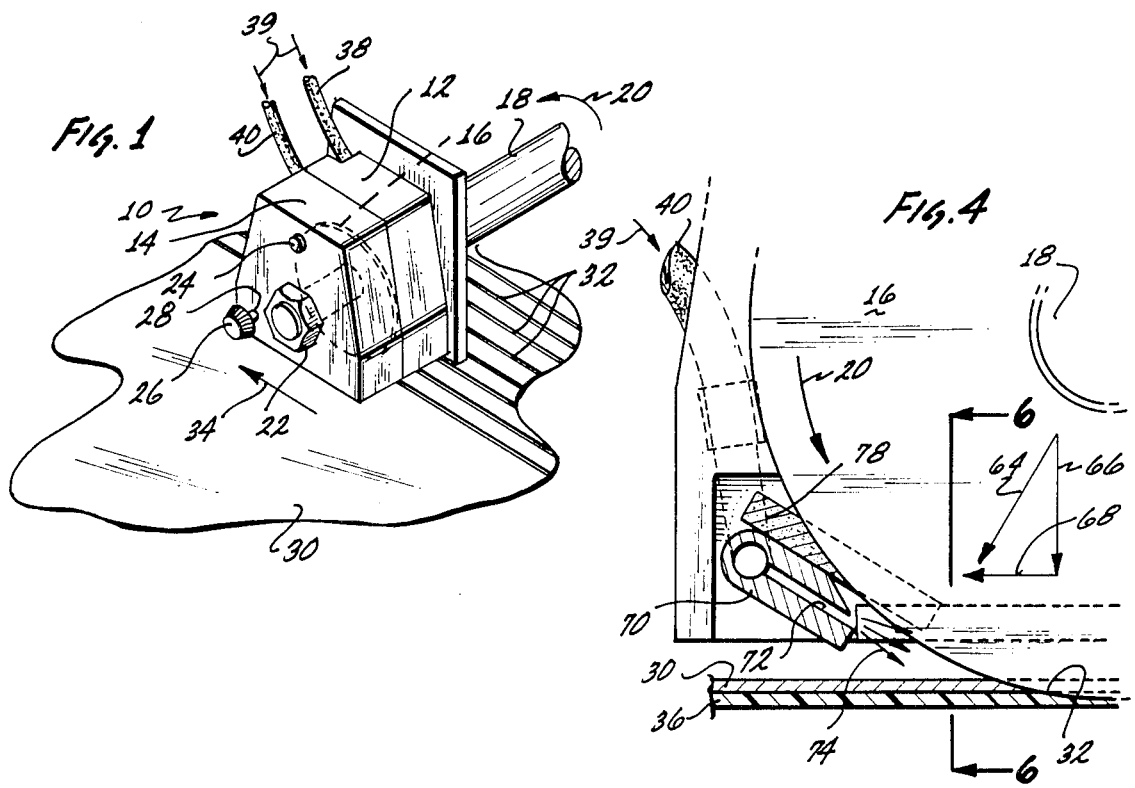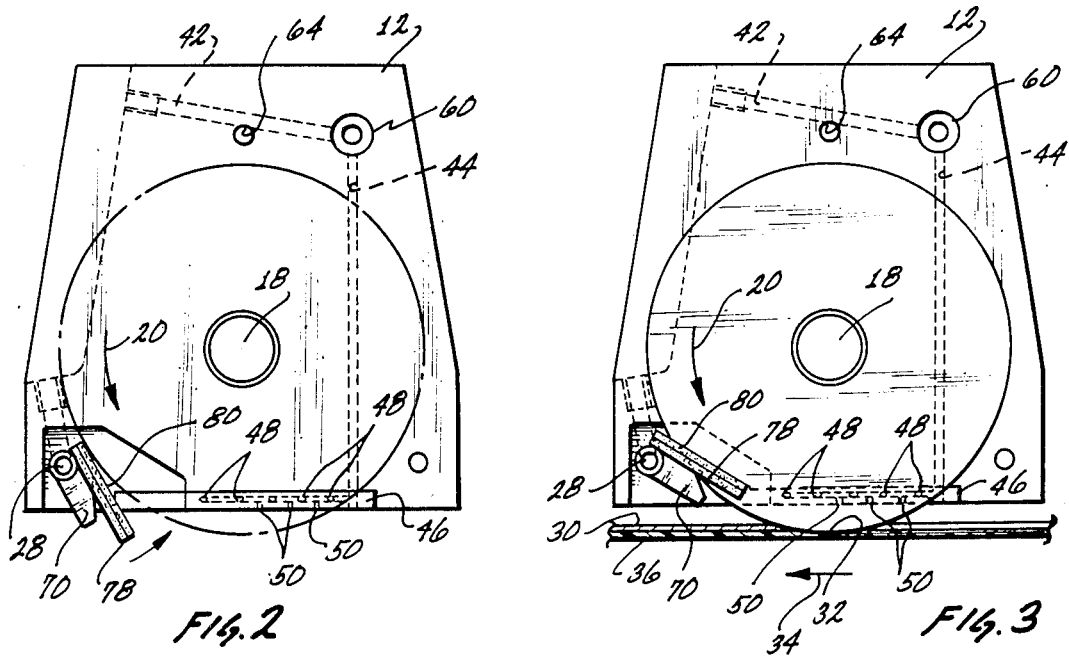

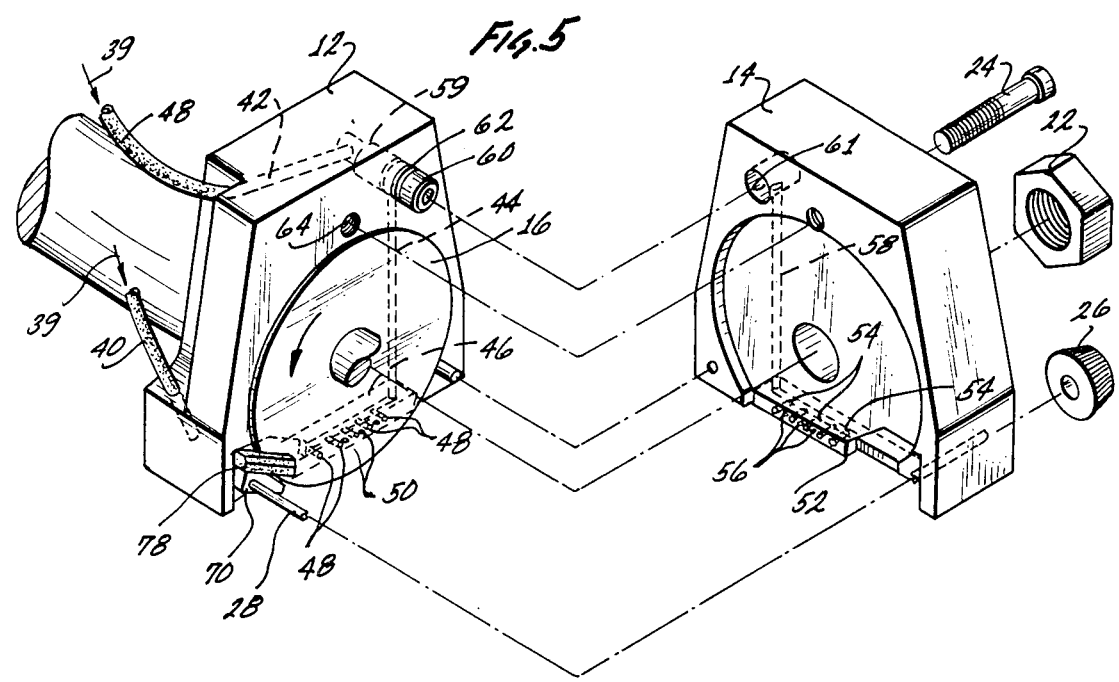
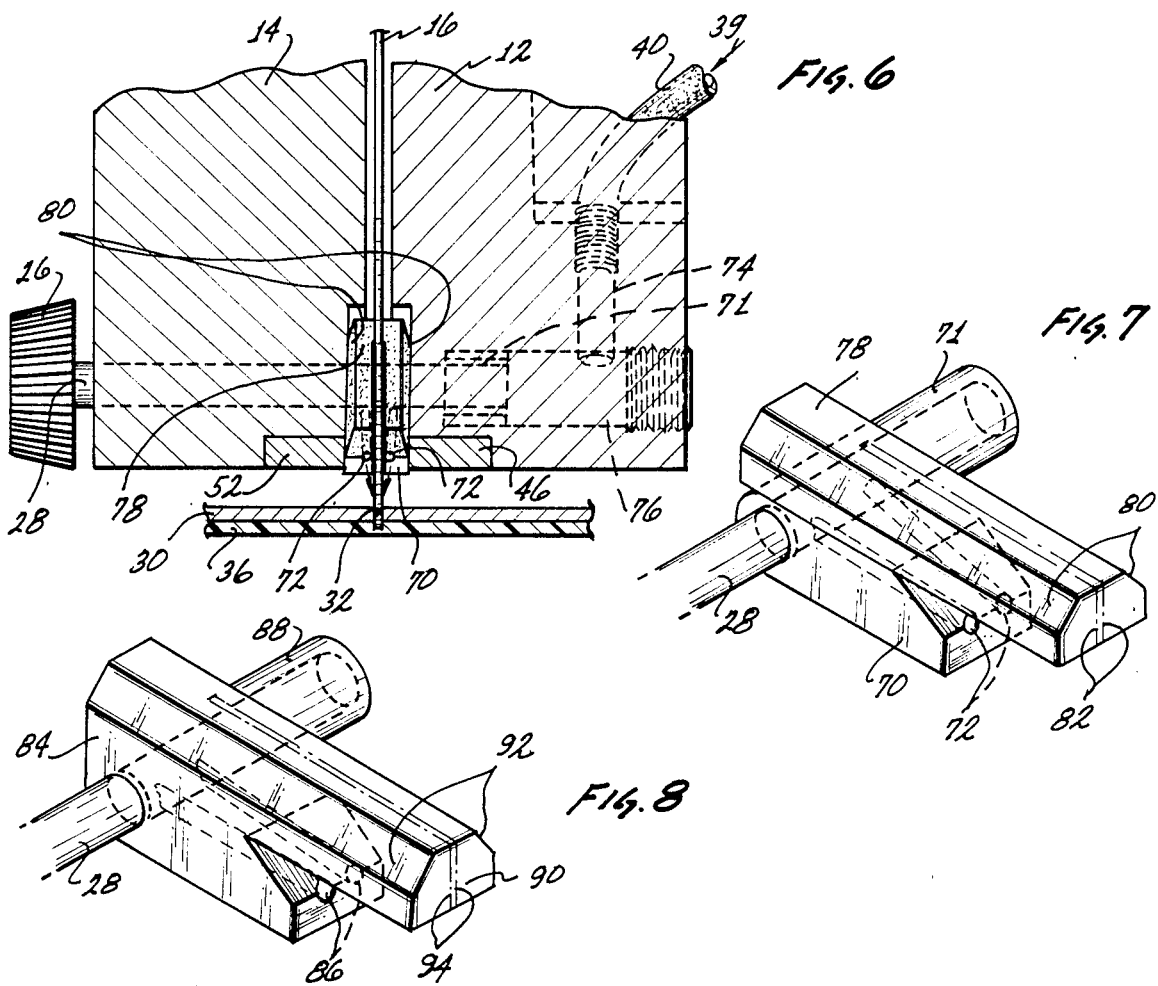

COMBINED NOZZLE WITH AIR FOIL

BACKGROUND OF THE INVENTION

1. Field of the Invention

The present invention relates to a combined nozzle and air foil for use with a cutter blade. Specifically, the combined nozzle and air foil of the present invention is used with a cutter blade such as a saw or grinding wheel for cutting hard substrate material such as ceramic or semi conductor material.

2. Description of the Prior Art

During the sawing or grinding of hard substrate material, it is very important to eliminate the build up of debris inside the kerf or cut made by the saw or grinding wheel. If this debris is not removed, it can impede further sawing or grinding. Also, if this debris is not removed, it can actually become reattached to the substrate because of the high temperatures which are built up during the sawing or grinding operation.

Prior art devices have attempted to remove this debris by flooding the area with water or other cooling fluid to cool the cutting blade and flush out the debris from the kerf or cut. This technique becomes less efficient as the speed of the cutting blade increases and as the size of the cutting blade increases. This is due to the increase in the air flow forces as the speed of the blade increases and the size of the blade is larger. The increase in the air flow forces creates problems because the air flow forces includes both a downward component and a backward component. The backward component tends to resist the flow of water to the surface of the substrate to thereby hinder the removal of the debris from the cut area.

SUMMARY OF THE INVENTION

The present invention overcomes the above difficulties by providing for a nozzle incorporating an air foil. The air foil is designed to produce an area of partial vacuum adjacent the blade on both sides of the blade and below the air foil. The partial vacuum thereby provides for an efficient water flow to the surface of the blade and to the substrate.

With the combined nozzle and air foil of the present invention, the air foil is cut by the blade itself so that each air foil is custom cut to perfectly compliment the associated cutting blade. For example, the air foil may be formed as an elongated member mounted above and extending from the nozzle. The combined nozzle and air foil are movably mounted to have the air foil moved into the blade and with the blade cutting a groove in the air foil to thereby partially split the elongated member so that it lies on both sides of the blade.

The elongated member is shaped to provide for the proper air flow to produce the partial vacuum below the air foil on both sides of and immediately adjacent the nozzle. The nozzle directs a cooling and cleaning fluid, such as water, towards the blade and the cut in the substrate. Since the air foil is custom cut for each individual blade, this automatically compensates for any differences in thickness for different blades. Also as the blade is used and is worn away, the position of the air foil may be adjusted to provide for the proper operation of the air foil relative to the flow of fluid.

The air foil may be constructed of any appropriate material either metallic or plastic in nature. As a specific material, the air foil may be composed of a wheel dressing material, such as a ceramic material, so that as the air foil is moved into engagement with the blade to cut and thereby form the air foil, at the same time the blade is dressed prior to its use as a cutting member for the substrate.

BRIEF DESCRIPTION OF THE DRAWINGS

A clearer understanding of the invention will be had with reference to the following description and drawings wherein:

FIG. 1 is a perspective view of a split housing assembly incorporating the combined nozzle and air foil for providing a flow of cooling and cleaning fluid;

FIG. 2 illustrates a front view of the housing assembly of FIG. 1 with the front half removed and prior to the air foil being brought into engagement with the blade;

FIG. 3 illustrates a front view of the housing assembly with the front half removed and with the air foil rotated into engagement with the blade to have the blade cut the air foil and with the blade cutting the substrate;

FIG. 4 is an enlarged cross sectional view of a portion of the structure shown in FIG. 3 and showing the air foil as cut by the blade and the direction of the fluid flow toward the blade and substrate;

FIG. 5 is an exploded perspective view of the split housing assembly incorporating the combined nozzle and air foil;

FIG. 6 is a cross sectional view taken along lines 6—6 of FIG. 4 and with the blade cutting the substrate as the fluid is directed to the cut area;

FIG. 7 is a detail view of a first embodiment of the combined nozzle and air foil wherein the air foil and nozzle are separate members; and FIG. 8 is a detail view of a second embodiment of a combined nozzle and air foil wherein the air foil and nozzle are formed as one integral member.

DESCRIPTION OF THE PREFERRED EMBODIMENTS

As shown in FIGS. 1 and 5, a split outer housing 10 formed by housing members 12 and 14. The housing 10 receives and supports a cutting blade 16 which blade may be a saw blade or a thin grinding wheel. The blade 16 is mounted on the end of a rotary spindle 18 and with the spindel rotated in the direction shown by the arrow 20. The blade 16 is locked onto the spindle 18 by a nut member 22. The two housing members 12 and 14 are held together by a bolt 24 which threads into an opening 64. Also extending to the outside of the housing 14 is a knob 26 which knob is mounted on the end of a shaft 28. The blade 16 is used to provide for a cutting action of a substrate 30 as shown by the cuts 32. As the blade 16 is rotated in the direction shown by the arrow 20, the substrate 30 is moved in the direction shown by the arrow 34 so as to provide for the cutting of the substrate 30.

As shown in FIGS. 3 and 4, the substrate 30 is actually mounted onto a backing material 36. Specifically, the substrate 30 may be adhesively attached to the backing material 36. The blade 16 cuts completely through the substrate 30 but only partially through the backing material 36. In this way, as the substrate 30 is cut into small pieces, the individual pieces are still retained on the backing material 36. The substrate 30 may be cut in parallel lines as shown by the cuts 32 in FIG. 1. After the entire substrate is cut, then the substrate may be rotated ninety degrees and cut again so as to produce a plurality of small rectangular or square members such as are used in the semiconductor industry to product integrated circuits.

As shown in FIGS. 1 through 6, at the same time that the cutting action is provided by the blade 16, a flow of cooling and cleaning fluid is supplied to flood the cutting area and thereby remove any debris which would tend to accumulate in the cuts 32. This fluid, as shown by arrows 39, is initially supplied through flexible tubing 38 and 40 to interior pathways in the housings 12 and 14. Specifically, the fluid 39 supplied through the tube 38 passes through a passageway 42 in housing 12 and then down a second passageway 44 to a first nozzle 46 mounted at the bottom of the housing 12. The first nozzle 46 includes a plurality of openings 48 to direct fluid towards the side of the blade 16. The nozzle 46 may also include openings 50 which are directed downward to flood the surface of the substrate 30 for removal of debris which may be lying on the substrate surrounding each cut 32.

The housing 14 includes a second nozzle 52, similar to nozzle 46, which includes openings 54 and openings 56 to direct fluid both to the other side of the blade 16 and to the surface of the substrate 30. The fluid is supplied to the second nozzle 52 through a passageway 58 and with the passageway 58 interconnected to the fluid supply line through a rigid tube member 60 extending from an opening 59 in housing 12. The tube member 60 is positioned within an opening 61 in the housing 14 so that the openings 59 and 61 and tube member 60 form a passageway between the passageway 42 and the passageway 56.

Since the housings 12 and 14 may be at times separated from each other, the tube 60 may be permanently positioned within the opening 59 in the housing 12 but may include an O-ring seal 62 so that the tube 60 may be slipped into the opening 61 in the housing 14. The housings 12 and 14 are held together with the bolt member 24 which passes through an opening in the housing 14 and is threaded into the threaded opening 64 in the housing 12.

The first and second nozzles 46 and 52 have in the past been used to flood the blade and substrate to remove any debris in the cut or on the surface of the substrate. However, as the speed of the blade increases and the size of the blade increases, these type of nozzles have been insufficient to properly remove all of the debris. In order to increase the flow of fluid, the present invention provides for a third nozzle 70 to direct cooling and cleaning fluid directly toward the sides and bottom of the blade, as it produces the cutting action, to thereby induce a further cleaning of any debris within the cut. Unfortunately, this flow of fluid is hampered by the air flow forces produced by the rotating blade which air flow forces tend to repel the fluid from contacting the blade and substrate in the area of the cut.

This may be specifically seen in FIG. 4 where the air flow force is represented by the force line 64. This force includes a downward component 66 and a backward component 68 which tends to produce an air flow in a direction backward to the direction of rotation 20 of the blade 16. In order to provide for a proper flow of fluid to the cutting area, the present invention includes an air foil structure to negate the effect of the repelling force formed as the blade rotates.

The third nozzle 70 is supplied fluid so that the fluid is discharged through openings 72 in the direction shown by the arrows 74 in FIG. 4. The fluid as shown by the arrows 74 is directed to the sides of the blade 16 and into the cuts to remove debris produced as the blade cuts the substrate 30. The fluid 39 supplied to the tubing 40 is interconnected with the third nozzle 70 by the use of passageways 74 and 76, as shown in FIG. 6.

The nozzle 70 includes a tubular portion 71 which is received within the opening 76. As indicated above, if the nozzle 70 were used by itself, the fluid flow would tend to be pushed backward due to the backward air forces formed as the wheel rotates. The efficiency of the debris removal would be significantly impaired unless an enhancement of the fluid flow is provided. The present invention additionally provides for the use of the air foil to form a partial vacuum in the area in front of the nozzle 70 to thereby provide for a much more efficient fluid flow to the surface of the blade and to the cutting area.

A first embodiment of the nozzle 70 combined with an air foil 78 is shown in FIGS. 2 through 7, in particular, as shown in FIGS. 2 and 7 the air foil 78 is initially formed as a solid elongated block of material having tapered or curved portions 80 to form the air foil surfaces. The leading edges of the air foil therefore have a smaller cross section than the trailing edges. The air foil 78 is mounted to extend from the top of the nozzle 70 and is movably mounted with the nozzle 70 to rotate into engagement with the cutting blade 16. The housing member 14 may be formed of a clear plastic so that the rotation of the nozzle and air foil may be visually observed. The nozzle 70 includes the shaft member 28 which shaft member extends through an opening in the housing 14 and with a knob 26 attached to the end of the shaft member. The combined structure of the nozzle and air foil may then be rotated, using the knob 26, into engagement with the blade 16.

Specifically, the combined structure is rotated so that the air foil 78 is cut by the blade 16, as shown by the dotted line 82 in FIG. 7. The combined structure is rotated by visual observation to the position shown in FIGS. 3 and 4. At this position 16, the blade has cut a substantial slot in the air foil 78 and the nozzle 70 is properly positioned to direct the fluid flow downward towards the sides of the blade and towards the cut in the substrate 30. The air foil 78 now includes two portions straddling the blade and forming a air foil unique to each particular blade. Since a new air foil is custom cut for each blade, this automatically compensates for differences in thickness between different blades. Each air foil therefore is custom made to produce a unique fit to the particular blade.

As the air flows over the air foil, a partial vacuum is formed below the air foil 78 in the region where the fluid is discharged from the openings 72 in the nozzle 70. This partial vacuum therefore tends to draw the fluid into an efficient contact with the surface of the blade and into contact with the cutting area between the blade and the substrate.

The air foil 78 may be constructed of a variety of different materials. For example, the air foil may be constructed of a plastic material or may be constructed of a metallic material. As an additional feature, the air foil may be constructed of a material which is normally used to provide for dressing the blade prior to use. Specifically, this type of material may be a ceramic material which is used by running the blade through the material to dress the blade prior to cutting. This dressing eliminates any irregularities or burrs that may be formed on the blade during manufacture. When the air foil 78 is formed of such a blade dressing material, then the cutting of the slot 82 in the air foil 78 not only provides for the custom fit air foil but also at the same time dresses the blade prior to cutting the substrate.

As a second embodiment for a combined nozzle and air foil, the combined structure may be formed as a unitary piece as shown in FIG. 8. Specifically, in FIG. 8, a body member 84 includes a lower portion having openings 86 to receive and dispense cooling and clearing fluid supplied to a side tubular portion 88. This structure is of course similar to the nozzle structure shown in FIG. 7. The upper portion of the housing forms the integral air foil 90. This air foil includes shaped or curved portions 92 to form the air foil. The blade 16 is used to produce a slot 94 in the air foil portion 90 in the same manner as shown in FIGS. 2 and 3. The entire structure would be rotated from the position shown in FIG. 2 to the position shown in FIG. 3 as the blade 16 cuts the air foil 90.

It is to be appreciated that in place of the rotatable mounting of the nozzle and air foil, a linear movement might be provided to cut the air foil and position the nozzle. Also, it is to be appreciated that as the blade wears during the cutting of successive substrates, the position of the combined nozzle and air foil may be readjusted to compensate for the wearing of the blade.

It can be seen therefore that the present invention provides for an efficient flow of a cooling and cleaning fluid to a blade as the blade is used at high speed to cut a substrate. In particular, the invention includes the use of an additional nozzle mounted between the blade and substrate to direct the flow of fluid to both sides of the blade and to the cutting area between the blade and substrate to provide for an efficient flow of fluid to the surface of the blade to thereby cool the blade and also remove any debris formed within the cut. The air foil is initially formed as an elongated member having shaped surfaces and with each air foil custom cut by its associated blade to thereby compensate for any differences between blades. As the blade is ground away during use, the combined nozzle and air foil may be readjusted to provide for the desired flow of fluid to the blade and the cutting area.

The nozzle and air foil of the present invention may also be used in association with other nozzles which direct fluid to the surface of the blade and to the surface of the substrate being cut. The combined effect produces an efficient cleaning of any of the debris which may be deposited within the cut or to the sides of the cut so as to eliminate the possibility of any of this debris adhering to the substrate.

Although the invention has been described with reference to particular embodiments, it is to be appreciated that various adaptations and modifications may be made and the invention is only to be limited by the appended claims.

I claim:

1. A combined nozzle and air foil for providing a flow of cooling and cleaning fluid to a rotating cutting blade providing cutting of a substrate, including,
   a nozzle portion for location intermediate the cutting blade and the substrate at a position adjacent the substrate,
   the nozzle portion including at least one opening for directing a flow of cooling and cleaning fluid to the blade and to the cut area of the substrate,
   an elongated air foil portion mounted above and extending from the nozzle portion to be cut by the cutting blade to form an air foil on both sides of the cutting blade and with the air foil producing a partial vacuum below the air foil and adjacent the opening in the nozzle to provide an efficient flow of the fluid to the blade and the cut area of the substrate,
   the air foil portion including shaped surfaces on both sides of the cutting blade and with the top leading edges of the air foil smaller in cross section than the bottom trailing edges of the air foil, and
   means for movably mounting the combined nozzle and air foil portions for providing movement of the combined nozzle and air foil to have the air foil engage the cutting blade to custom cut the air foil to match the dimensions of the cutting blade and to provide the proper location of the nozzle to direct the flow of the fluid.

2. The combined nozzle and air foil of claim 1 wherein the nozzle includes a plurality of openings for directing the flow of cooling and cleaning fluid to both sides of the blade.

3. The combined nozzle and air foil of claim 1 additionally including a split housing for receiving and supporting the blade and the nozzle and air foil and with the split housing receiving and supporting additional nozzle members located on either side of the blade adjacent the substrate for providing an additional flow of cooling and cleaning fluid to the blade and substrate.

4. The combined nozzle and air foil of claim 3 wherein the split housing includes passageways for supplying the fluid to the nozzles.

5. The combined nozzle and air foil of claim 3 wherein the means for movably mounting is formed by the split housing and provides for a rotatable movement of the nozzle and air foil.

6. The combined nozzle and air foil of claim 5 wherein the combined nozzle and air foil includes a shaft extending through the housing to an exterior position and a knob mounted to the shaft for rotating the nozzle and air foil into engagement with the blade.

7. The combined nozzle and air foil of claim 1 wherein the means for movably mounting provides for rotatable movement of the nozzle and the air foil.

8. The combined nozzle and air foil of claim 7 wherein the means for movably mounting includes a shaft extending from the nozzle and air foil and with a knob attached to the end of the shaft for providing the rotatable movement of the nozzle and the air foil.

9. The combined nozzle and air foil of claim 1 wherein the air foil portion is formed of a wheel dressing material.

10. A combined nozzle and air foil for providing a flow of cooling and cleaning fluid to a rotating cutting blade providing cutting of a substrate, including,
    a split housing for receiving and supporting the blade,
    a pair of nozzle members mounted on the split housing for location on either side of the blade adjacent the substrate to direct cooling and cleaning fluid to the blade and substrate,
    a third nozzle member for location intermediate the cutting blade and the substrate at a position adjacent the substrate,
    the third nozzle member including at least one opening for directing an additional flow of cooling and cleaning fluid to the blade and to the cut area of the substrate, an elongated air foil portion mounted above and extending from the third nozzle member to be cut by the cutting blade to form an air foil on both sides of the cutting blade and with the air foil producing a partial vacuum below the air foil and adjacent the opening in the third nozzle to provide an efficient flow of the fluid to the blade and the cut area of the substrate, an elongated air foil portion mounted above and extending from the third nozzle member to be cut by the cutting blade to form an air foil on both sides of the cutting blade and with the air foil producing a partial vacuum below the air foil and adjacent the opening in the third nozzle to provide an efficient flow of the fluid to the blade and the cut area of the sbustrate, the air foil portion including shaped surfaces on both sides of the cutting blade and with the top leading edges of the air foil smaller in cross section than the bottom trailing edges of the air foil, and means for movably mounting the third nozzle and air foil for providing movement of the third nozzle and air foil to have the air foil engage the cutting blade to custom cut the air foil to match the dimensions for the cutting blade and to provide the proper location of the third nozzle to direct the flow of the fluid.

11. The combined nozzle and air foil of claim 10 wherein the third nozzle member includes a plurality of openings for directing the flow of cooling and cleaning fluid to both sides of the blade.

12. The combined nozzle and air foil of claim 10 wherein the split housing receives and supports the third nozzle member to provide the additional flow of cooling and cleaning fluid to the blade and substrate.

13. The combined nozzle and air foil of claim 10 wherein the split housing includes passageways for supplying the fluid to the nozzles.

14. The combined nozzle and air foil of claim 10 wherein the means for movably mounting is formed by the split housing and provides for a rotatable movement of the third nozzle and air foil.

15. The combined nozzle and air foil of claim 10 wherein the third nozzle and air foil includes a shaft extending through the housing to an exterior position and a knob mounted to the shaft for rotating the third nozzle and air foil into engagement with the blade.

16. The combined nozzle and air foil of claim 10 wherein the air foil portion is formed of a wheel dressing material.

* * * * *